United States Patent [19]

Hayden

[11] Patent Number: 4,761,543
[45] Date of Patent: Aug. 2, 1988

[54] HOLOGRAPHIC SECURITY DEVICES AND SYSTEMS

[76] Inventor: Kenneth J. Hayden, 14 Valley Road, Plympton, Plymouth, Devon, United Kingdom

[21] Appl. No.: 925,088
[22] PCT Filed: Mar. 3, 1986
[86] PCT No.: PCT/GB86/00109
  § 371 Date: Oct. 30, 1986
  § 102(e) Date: Oct. 30, 1986
[87] PCT Pub. No.: WO86/05300
  PCT Pub. Date: Sep. 12, 1986

[30] Foreign Application Priority Data
  Mar. 1, 1985 [GB] United Kingdom ................. 8505361
  Jan. 3, 1986 [GB] United Kingdom ................. 8600081

[51] Int. Cl.⁴ ............................................. G06K 7/10
[52] U.S. Cl. ..................................... 235/457; 235/485
[58] Field of Search ................. 235/457, 485; 350/3.6, 350/3.61

[56] References Cited
U.S. PATENT DOCUMENTS
4,108,367 8/1978 Hannan ............................... 235/457
4,171,766 10/1979 Ruell .................................. 235/457

Primary Examiner—Harold I. Pitts
Attorney, Agent, or Firm—Cushman, Darby & Cushman

[57] ABSTRACT

An identifiable security device comprises a carrier (1), such as a key card, credit card or document, supporting a thick film hologram (5) including at least one discrete reflective region (6) which, when illuminated reflects strongly in a specific, predetermined direction. A reader (2) incorporates a light source (7) and one or more photodiode detectors (8,11) arranged to detect the directional reflections, to discriminate against non-holographic reflections and to perform a security function on detection of appropriate reflections. The function may comprise authentication of a carrier bearing a simple hologram, but more complex hologram having a plurality of reflective regions arranged in a coded array are used, for example, on bank cheque cards to operate automatic bank dispensers and on pass cards for gaining entry to secure areas.

33 Claims, 5 Drawing Sheets

HOLOGRAPHIC SECURITY DEVICES AND SYSTEMS

This invention relates to security devices incorporating security information in a hologram, to security systems employing such devices to release a lock, operate a switch or perform some other security function, and to a method for making a hologram for use in such a device.

It is known to employ key cards provided with an operating code incorporated in a magnetic "stripe" or in a visual bar code. The code carried by such cards is "read" by a magnetic or optical decoder forming part of a security system, but for use in certain environments, for example in petrol filling stations, a magnetic-code-bearing key card has proved unsuitable, and the scanning system necessary with a key card having a bar code has proved to be too expensive.

It is also known to provide coded information in holographic form but the holograms and readers used to date necessitate the reconstruction of entire holographic images and their focusing on appropriate detectors and are complex and expensive.

An object of the present invention is to provide a security device and a security system for checking, or incorporating, such a device, which combine high security with the advantages of a non-contact reading or scanning arrangement and which are simpler and cheaper to manufacture than comparable known systems.

Accordingly, the present invention provides an identifiable security device comprising a carrier supporting holographically-applied identifying information, characterised in that said information is provided in a thick holographic film, as herein defined, and includes at least one discrete reflective region adapted to be read directionally and optically according to at least one optical parameter comprising intensity, wave length and polarisation of light reflected from the reflective region.

A further aspect of the invention provides a security system in which a security device as just defined is read by a reader arranged to perform a security function such as release of a lock or operation of a switch upon detecting the at least one discrete reflective region of the security device, the reader having a reading position for the carrier, means for illuminating the at least one reflective region when the carrier is at the reading position and reading means for optically and directionally detecting light reflected from each reflective region according to at least one optical parameter comprising intensity, wave length and polarisation of light and for discriminating against non-holographic reflections therefrom.

In the present invention, the holographic information is provided in a "thick-film" reflection hologram, a type generally known in the art, in which interference fringes are stored within the 3-dimensional volume of a thick photographic emulsion. The interference fringes are arranged to provide discrete reflective regions, these regions reflecting strongly light of the wave length of the laser light which created the fringes: the emulsion is transparent to or opaque to light of other wavelengths, this light being absorbed or scattered at the surface of the emulsion or of an underlying support but not being reflected strongly in a specific, predetermined direction.

The radiation currently usable lies in the U.V.—visible light—I.R. band of the spectrum but, for simplicity, will be termed "light" in the following specification. Similarly terms such as "light detector" and "light source" will be used to include U.V. and I.R. detectors and sources.

The use of a thick-film hologram, as opposed to a thin-film hologram, facilitates the reading of the holographic information in that a non-coherent light source rather than a laser may be used to illuminate the hologram for it to be read in a security system of the invention. The light source, preferably incorporated in the system, may emit white light or a more limited range of wave lengths, including that reflected by the reflection regions and may illuminate all or part of the hologram.

The photographic emulsion is normally supported on a thin transparent substrate such as a cellulose or plastics film which may be glued directly, or with the interposition of an opaque film, to the surface of a support such as a key card, although examples of many other supports will be given below. The hologram may alternatively be fixed within a window in the card, embedded in the plastics, or attached in any other manner which ensures that it cannot be removed without damage. Conceivably the photographic emulsion may be supported directly on a card or other support, such as a glass plate without the need for the cellulose or other backing.

The holographic information is provided in the form of discrete reflective regions; a single reflective region suffices in some embodiments of the invention but in more complex systems a plurality of reflective regions are distributed across the surface of the film in a predetermined, coded array and arranged to reflect light incident on them each in a respective direction, at a selected angle to the normal to the film. The discrete reflected beams may be picked up by a detector or array of detectors provided in the security system and arranged to instigate the security function only if the entire, predetermined, coded array of reflected beams is "seen". The reflective regions may be of any convenient shape, such as dots, bars or Moray fringes.

In order for the detector system to discriminate between holographic reflective regions, which reflect strongly in the selected direction only, and marks on or in the film which scatter light in all directions, an auxiliary detector or detector array is provided to detect light reflected from a reflective region of the film in an arbitrary direction other than the selected direction. In use, the security system would be arranged not to instigate the security function if both detectors detect reflected light from a reflective region above respective predetermined intensity thresholds.

In practice, the auxiliary detector would have a threshold set at a level just above the general background light expected from a particular hologram and carrier to be used in a system, this background varying according to the reflectivity of the carrier, the strength of the illumination, any screening against ambient light and numerous other factors. In some cases it may be necessary to arrive at a suitable level by trial and error. The detector proper would have a higher threshold, the threshold being below the maximum intensity of reflection expected.

Usually the transparent holographic film is fixed to a uniformly dark substrate so as to reduce the light scattered from the background and enhance the sensitivity of the system but it is also feasible to fix the transparent film directly to a carrier so that the carrier is visible through the hologram. This may, for example, be useful for protection of a signature or identity photograph particularly if the reflection is of a wavelength near either end of the visible spectrum and is scarcely noticeable to the naked eye.

It will be appreciated that, in the security device of the invention, reflection, if indeed that is the correct term, occurs at the interference fringes created holographically within the thickness of the photographic emulsion and it is this fact which makes the device inherently secure. The strongly directional nature of the reflection means that, even in embodiments in which the holographic coded pattern is visible, copying of the pattern in the form, say, of spots painted, etched or produced by ordinary photography on a film would not produce a device which would fool a security system of the invention. Nor is a thick-film reflection hologram readily copyable, per se, as are other types of hologram, such as embossed holograms.

It should also be emphasized that the security device of the invention includes "holographically applied information" in the form of "discrete reflective regions" and it is the light reflected from these regions specifically which is detected in the system of the invention; for this purpose detectors, such as photodiodes, may be located close to the hologram so as to pick up reflected light each directly from a respective reflective region; no lenses are needed to focus the light on the detectors although fibre optic cables may conduct light from the reflective regions to the detectors. The detectors, or ends of the fibre optic cables may, indeed, be as close as 1 mm to the film and preferably less than 30 mm. This is contrary to prior art systems employing holograms in which light from the entire area of the hologram is focused on a detector or array of detectors.

Similarly, in prior art systems the holographic film as a whole is illuminated in order to recreate the hologram for detection, whereas, in the present invention, only the discrete reflective regions need be illuminated. An immediate advantage of this fact is that only small, low-power light sources, such as LEDs, are needed to direct light at respective reflective regions and, if the discrete regions are arranged in one line in the hologram, the reader for the security device need have only one LED for illumination and one principal detector for detection, the regions being illuminated and detected as the carrier is fed through the reading position.

Such LEDs may also be located between about 1 mm and about 30 mm from the film.

A further indication of the difference between the hologram as used in the present invention and in the prior art lies in the fact that the discrete reflective regions used are indeed localised in specific areas of the holographic film; thus, if the film is cut, the reflective regions can be separated and the hologram is no longer usable in systems of the invention, except in a specific embodiment described below which utilises this property. The film may, however, also carry a reproducable image of the entire set of reflective regions which is a true hologram and is not destroyed by cutting of the film. The entire hologram can be reproduced by illumination of each of the cut pieces, but it is NOT this holographic image which is detected by the present system: this being understood, the term hologram will be used below for holographic films incorporating discrete reflective regions.

The holographic film may be attached to any appropriate substrate which may be flat or curved. The film may occupy a few square centimeters or may be as small as a dot for applications in which it is not wished to advertise the presence of the hologram. The film is preferably protected by an applied plastics coating which would normally be transparent but in the case of I.R. holograms may be opaque to visible light.

The hologram, when illuminated, reflects light at a specific wavelength and with a specific polarisation. The reader may be rendered responsive to light at that wavelength only; a suitable filter may, for example, be provided between the hologram and the detector to filter out background radiation of wavelengths other than the said wavelength to improve signal/noise discrimination. A polarisation filter may also be used.

A security device of the invention may include more than one hologram, either on different areas of the carrier or superposed on each other, or a hologram which has been exposed several times in order, for example, to provide different codes for performing different security functions. Each coded array of reflective regions may, for example, reflect light at different angles or at different wavelengths to be read by different detectors. Alternatively, one of the hologram exposures may be purely decorative or may comprise an identifying logo, brand name or device provide solely for visual inspection. The coded hologram for reading by a security system may be concealed, or at least confused, by such a visual hologram, or indeed by a surface pattern on the holographic film, and I.R. holograms may be concealed by a coating which is opaque to visible light. A coded hologram may be rendered even more difficult to forge or to read by an unauthorized reader by means of a scrambler employed in the manufacture of the hologram, the authorized reader being fitted with the appropriate descrambling apparatus.

Alternatively the holographic film may be arranged to be substantially-uniformly reflective in unpolarised light but have a said at least one discrete reflective region which reflects light with a different polarisation from the rest of the film, which region is detectable through a polarising filter.

The security function carried out by the system of the invention may simply comprise the authentication of a substrate carrying the hologram. For example, a syste may be arranged to distinguish between authentic bank notes having a specific applied hologram and forged notes without the appropriate hologram. Notes of the same denomination would preferably carry identical holograms which would be different from those on other denominations to prevent the fraudulent transfer of a hologram from one note to another, although this may be rendered effectively impossible, at least without detection, by other means, such as the use of a security glue to attach the holographic film to the note. Such "authentication" security systems have far-ranging implications as they may be applied to goods from credit cards to tickets, passports and documents in general, to discs and tapes or any goods with specific brand names. As regards documents, these may comprise groups of similar items, such as licenses or share certificates issued by a particular authority or company, or individual items, such as wills, cheques identity cards or agreements, in which case a signatory might place a personalised hologram over or adjacent his signature. Such a hologram could comprise or include the person's thumb print.

If the security function comprises solely the authentication of a carrier, as described above, the hologram reader may be arranged simply to operate advisory means such as an indicator light or buzzer when an authentic carrier is presented to it. In other cases the hologram-bearing carrier may be used to unlock or operate a mechanism, as in the case of pass cards for allowing access to secure areas. In fact, the hologram may be coded to instigate a variety of procedures, either through direct connections or under the control of a computer. Particularly in the latter case, an oscillating light source may be used to illuminate the hologram so that the reader output is modulated and easier to utilise in electronic circuitry.

It is envisaged that the system of the invention will be useful in association with bank cheque cards, the hologram preferably including data corresponding to the card number or other essential information which enable the card to be used in automatic machines for withdrawing money, or performing other functions. Bearing in mind the enormous number of codes required to provide each bank customer with a personalised card, it is interesting to note that holograms having an area of approximately 1600 mm$^2$ can carry a 100 bit code.

It will be appreciated that the manufacture of such a multitude of different holograms by current techniques, would be prohibitively expensive since the setting up of apparatus for holographic photography is a laborious process and only by taking numerous identical photographs in succession of the same object can the price of individual holograms be reduced to a level at which they are an economical proposition. A further object of the invention is therefore to provide a method for making a hologram for use in a security device of the invention and, more particularly, a cheaper method of producing a variety of holograms.

In the production of a thick-film reflection hologram, a laser beam is split into two parts, one of which illuminates the object to be photographed and the other of which is used as a reference beam. The reference beam and the beam from the object are made to fall on a photosensitive emulsion from opposite sides thereof and interfere within the thickness of the emulsion. The resultant chemical changes in the emulsion are fixed when the film is developed and are stored as a complicated interference pattern which, when illuminated and viewed from the same side of the film as the illumination, produce an image of the object.

In the present invention, thick-film reflection holograms are required which include at least one discrete reflective region which can be directionally and optically read as described above. The invention further provides a method for producing such a hologram, comprising setting up a holographic photography system including: a laser source; a thick-film photographic emulsion sensitive to the laser light; reflection means on the opposite side of the emulsion from the laser source for reflecting light from the laser source on to an area of the emulsion on which light is also incident directly from the laser; and an object located immediately adjacent the emulsion, on either side thereof, and having at least one discrete area transparent to the laser light, such that, in operation of the photography system, laser light is incident on the emulsion both through the transparent area of the object and directly from the reflection means or the laser source and creates an interference pattern in the emulsion.

On development and illumination of the emulsion, a hologram of the object with its transparent area is visible as a subsidiary feature but a discrete region of the emulsion, corresponding to the transparent area of the object, is strongly reflective in a direction dependant on the inclination of the reflection means to the plane of the emulsion.

If a hologram having an array of discrete reflective regions is required, then the object of the holographic photography system is provided with a corresponding array of transparent areas.

In the method given above, the term "immediately adjacent" the photographic emulsion is intended to mean a distance of a few centimeters, and preferably 5 mm or less from the emulsion. If the reflection means, normally a mirror, are sufficiently close to the emulsion, the object may comprise an apertured mask placed directly in front of the mirror, but preferably the object is generally planar and parallel to the plane of the emulsion.

Preferably the object comprises a panel incorporating polarisation-dependent material, respective zones of which are selectively polarised so as to be transparent or opaque to the laser light. The material may, for example, by POLAROID (Registered Trade Mark) film but real-time addressable systems are preferred, in which the polarisation of respective zones is variable, in known manner. Examples of such systems are Pockels Readout Optical Modulators, Hughes liquid crystal light valves, bismuth oxide crystals and liquid crystal displays (LCD). The method of the invention may, with this facility, provide a range of different holograms, each with a respective predetermined coded array of discrete reflective regions by appropriate switching of the polarisation zones between exposures of the holographic film.

In the case, for example, of an LCD panel, the switching of the LCD areas is preferably controlled by a computer which is previously supplied with a set of codes which it is desired to reproduce in holographic form via the LCD matrix. If several holograms of any one display code are required, then the computer may be programmed to maintain that display until the requisite number of film frames have been exposed before switching the LCD areas appropriately to the next coded display to be photographed.

If it is desired to change the angle and/or direction of reflection of the reflective regions of the hologram produced, the mirror may be mounted on a pivotable support, also under the control of the computer, so that the inclination of the mirror to the film may be changed when desired. The LCD panel may also be pivotable or rotatable. in its own plane.

The mirror is normally planar so that all the reflective regions produced by one halographic exposure reflect in parallel directions but the mirror may be faceted, the facets being inclined to each other so as to result in reflective regions which reflect in non-parallel directions.

In some cases, as indicated above, it is desirable to provide two or more differing holographic codes in a single piece of film. With the apparatus described above this can be achieved by controlling the film-feed so that a single film frame is exposed as many times as necessary, the LCD display and/or orientation of the mirror being changed between exposures.

According to further aspects, the invention provides apparatus for carrying out the method described above and a hologram, or series of holograms, produced by the method.

The invention will be further described by way of example only, with reference to the accompanying purely schematic drawings, in which.

Figure 1:
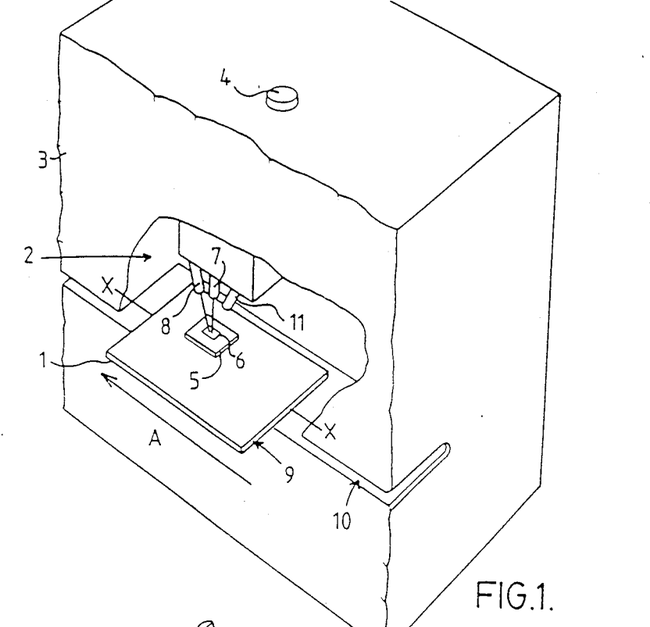
FIG. 1 shows the general optical arrangement of a security system according to a first embodiment of the invention.
Figure 2:
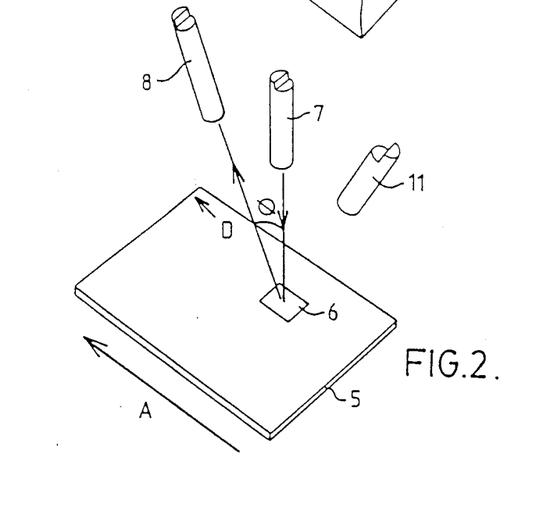
FIG. 2 shows part of the system of FIG. 1 on an enlarged scale.

Reference is first made to FIGS. 1 and 2 of the drawings which show schematically a security system for checking whether a ticket 1 is genuine or forged. The security system includes a reader 2 encased in a housing 3 carrying an indicator light 4 which is switched on if a genuine ticket 1 is presented to the reader 2. For checking by the reader 2, the genuine ticket 1 carries a thick-film hologram 5, approximately 5 mm square, and attached to the ticket 1 by a security glue such that it cannot be removed without damage to the hologram and/or the ticket.

The hologram 5 includes a single, discrete region 6 which, when illuminated, reflects light strongly in a specific direction D relative to the film and its carrier, in this case at an angle $\theta$ of 45° (see FIG. 2) to the normal to the film 5 and in a plane parallel to the longitudinal axis X—X of the ticket 1.

It will be appreciated that the choice of 45° for the angle $\theta$ is purely arbitrary but, to provide a strong reflection, $\theta$ is preferably between 0° and 60°. The direction D is also arbitrary.

The reader 2 is arranged to illuminate the region 6 and to detect the light reflected therefrom and, to this end, includes an LED light source 7, a photodiode detector 8 and a reading position 9 at which the ticket 1 is located in an appropriate relationship with the light source 7 and the detector 8. The reading position 9 is accessible through a slot in the housing 3 and, if the reading is to be effected with the ticket stationary, a stop (not shown) may be provided to limit the insertion of the ticket into the housing and to ensure its correct location at the reading position 9. In the embodiment shown, however, the slot gives access to a guide channel 10 in the side of the housing and extending through the reading position; the ticket 1 may be fed manually along the guide channel 10 in a direction parallel to its longitudinal axis, indicated by the arrow A, and is read as it passes through the reading position 9.

The relative geometrical arrangement of the parts of the reader are such that, when the ticket 1 is at the reading position 9, light from the LED 7 is incident normally on the area 6 of the hologram 5 and the photodiode detector 8 picks up light reflected from the region 6 in the direction D. Since the detector 8 would, in fact, also detect light scattered from say a white spot at the position of the region 6, the reader 2 includes an auxiliary photodiode detector 11 arranged to detect light reflected from the region 6 in a direction other than the direction D, and at an intensity higher than a predetermined threshold set in accordance with the general background radiation. The detector 8 has a slightly higher preset intensity threshold below which it is not activated.

In use of the security system shown, when a genuine ticket 1 is presented to the reading position 9 of the reader 2 and the LED 7 is switched on, only the detector 8 detects light reflected from the region 6 above the preset threshold and switching circuitry (not shown), of known type within the housing 3, is arranged to activate the indicator light 4. If, on the other hand, a forged ticket is presented to the reader 2, which ticket does not have a holographically applied region 6 reflecting in the specific, predetermined direction D, then either both or neither of the detectors 8 and 11 will detect light scattered from the region 6 have their respective thresholds; in each case the circuitry is arranged NOT to switch on the light 4 and the forgery will be detected.

The embodiment shown in FIGS. 1 and 2 is a very simple form of the invention, with very few components, which can be powered by a low-power supply such as a solid-state battery (not shown). The entire reader may be housed very compactly in a housing 3 of the size of a torch which may be formed with a convenient hand-grip (not shown) and provided with a switch for the LED 7.

The LED 7 may be visible from the exterior of the casing to show that it is working or an additional indicator light may be provided.

In this simple arrangement, a substantially-monochromatic LED is used as the light source and there is no need for optical filters in the system, specifically between the hologram 5 and the detectors 8 and 11 but, if a source which emits a range of frequencies is used, filters may be introduced to increase the signal/background radiation discrimination of the detectors. Again, in the simple example of FIGS. 1 and 2, the LED 7 and detectors 8 and 11 can be located extremely close to the film 4 (within 10-20 mm) and there is no need to provide a lens to focus light from the region 6 onto either of the detectors 8 or 11, or to provide an apertured stop in front of the detectors to eliminate background radiation. Such known aids may, however, be provided in systems with longer light paths. Similarly there is no need to collimate the light from the LED when it is close to the film.

The embodiment of FIG. 1 relates to a system for verification of a ticket to check for forgery and its principle may be applied to any document such as bank notes, key fobs, passports, licenses etc., or indeed to any other article, whether flat or curved, which it is wished to protect. For such uses the thick film hologram may be glued to the surface of the article, fixed in a window cut in the article, embedded in an article of suitable material, such as plastics, or attached in any other secure way which will enable it to be presented to a reader but which prevents its removal without detectable damage.

For simple verification of an article, a hologram with a single discrete reflective region 6 may suffice but holograms with several reflective areas, arranged in a coded pattern, are useful in other circumstances. One example of such a system is shown in FIG. 3 in which features similar to those in FIG. 1 are indicated by the same reference numerals.

Figure 3:
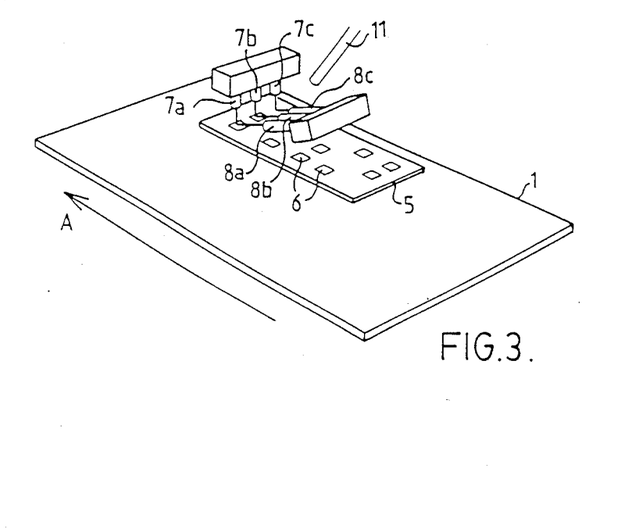
FIG. 3 is a schematic view of the general optical arrangement of part of a security system according to a second embodiment of the invention.

In the embodiment of FIG. 3, the key card comprises a bank cheque card which is read as it is fed through the reading position of a reader 2 in the direction of the arrow A, as in the embodiment of FIG. 1. The hologram 5 on the card bears a plurality of discrete reflective regions 6, termed "dots" below, arranged in three lines longitudinally of the card 1: it will be appreciated that the "dots" may be of any convenient shape.

The reader (only partly shown) includes three LEDs 7a, 7b, 7c each for illuminating the dots in a respective line and three photodiodes 8a, 8b, 8c each for detecting reflections from dots in a respective line as the card is fed through the reading position 9.

An auxiliary detector 11 is again provided for checking one of the lines to protect against forgery. A detector 11 may be provided for checking each line.

As the card 1 is moved through the reader, the detectors 8a, 8b, 8c are triggered in a sequence which depends on the positions of the dots 6 in the lines, the positions forming a code for operating an automatic bank dispenser. The code may, in fact, contain all the information which is normally provided in the magnetic stripe of current cheque cards and the reader circuitry (not shown) may be arranged to carry out all the functions of current systems. The oral 1 clearly has an advantage over current cheque cards in that it provides the information required for authenticating the card as well as for identifying the card in a single hologram; current cheque cards have a magnetic stripe containing identifying information AND a hologram (not of the specific thick-film type used in this invention) for authentication.

The hologram 5 may contain any number (including one) of lines of reflective areas and the spacing of dots in the various lines may differ. An automatic feed may be provided to feed the card through the reader at a predetermined speed, the detector circuitry possibly being arranged to take account of the timing of the triggering of the diodes 8.

Although the reader of FIG. 3 is arranged to read the code of dots on the card 1 as it moves through the reading position, such a card could be read while stationary by an appropriate reader having a single light source for illuminating the entire hologram 5 or a plurality of LEDs 7 for illuminating each position in the hologram which might be occupied by a dot. The same number of photodiode detectors 8 as the number of dot positions must be provided but the crowding produced by this arrangement can be mitigated by the use of appropriately-positioned fiber-optic light guides to conduct reflected light from the dots to the photodiodes.

A further variant of the invention will now be discussed with reference to FIG. 4.

Figure 4:
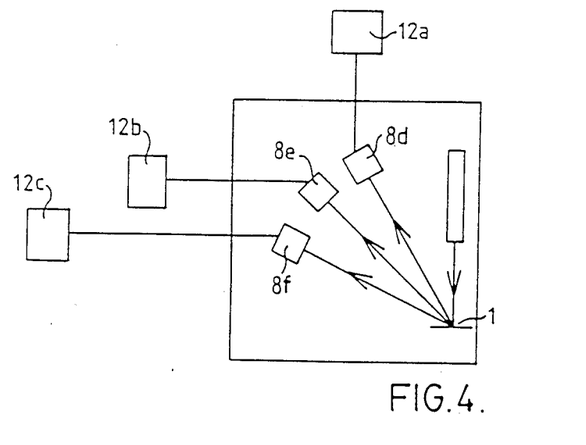
FIG. 4 shows purely schematically the general optical arrangement of a security system according to a further embodiment of the invention.

In FIG. 4, a reader system is shown which is similar to the reader system of FIG. 3 but in which three photodiodes 8d, 8e and 8f are arranged to detect reflected light at angles $\theta$ of 30°, 45° and 60° respectively from respective lines of reflective dots on a key card 1. FIG. 4 shows the reflected rays in the same plane purely for simplicity of illustration since the dots may reflect in totally different directions as well as at different angles.

Each photo-diode 8d, 8e, 8f is operatively connected to a respective security system 12a, 12b, 12c, which may for example comprise a locking system for one or more doors of a building. The connection may thus be such that, when one of the photodiodes 8d, 8e, 8f detects a correct array of dots on a card placed at the reading position, it unlocks the doors to which it is connected.

Key cards may be issued to personnel requiring access to the building, each card bearing a hologram with one or more of the lines of dots detectable by the photodiodes 8d, 8e and 8f to allow operation of one or more of the locking systems and permit access to different parts of the building. Clearly the number of holograms provided on any one card and the number of diodes in any one reader is not limited to three. Also any one reader may have only one or two of the photodiodes 8d, 8c, 8f so as to operate only one of the security systems 12a, 12b, 12c. Furthermore, although the lines of dots may be arranged in adjacent areas of the hologram, as in the card of FIG. 3, they may alternatively be superposed on each other in the same area of the hologram; this may be achieved by multiple exposure of the hologram or by sticking one hologram on top of another.

Although the system of FIG. 4 has been described as operating several locking systems, it could operate only one system, the different directions and angles of reflection from the lines of dots providing added security against forgery. In a reading system having a photodiode for each dot position, all the dots may reflect in different directions and at different angles.

It should also be mentioned that the number of codes available could be further increased by providing holograms and readers operating at different wavelengths or different intensities. To give the simplest example, a single dot hologram operating in the green frequency range could be arranged to instigate a different function from a single dot hologram at the same spatial position but operating in the red frequency range.

It will be appreciated that many security functions currently require the cooperation of two or more personnel; for example, two keys held by different people may be required to open a safe. The present invention can also fulfil this requirement, as is shown in the sketches of FIGS. 5 and 6.

Figure 5:
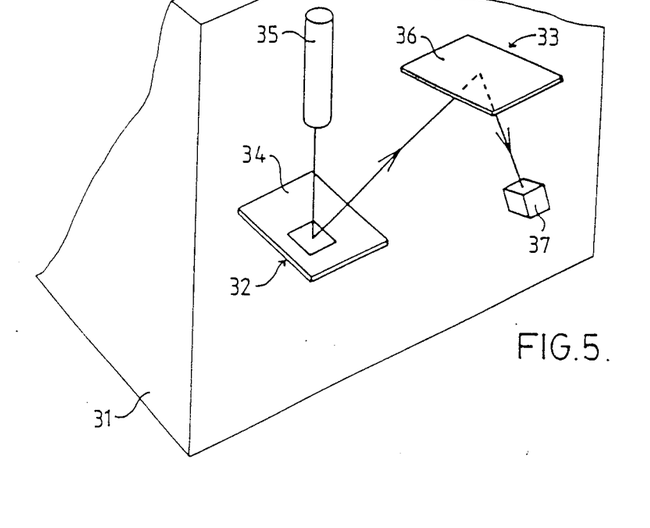
FIGS. 5 and 6 show, purely diagrammatically, respective security systems each operated by two key cards.
Figure 6:
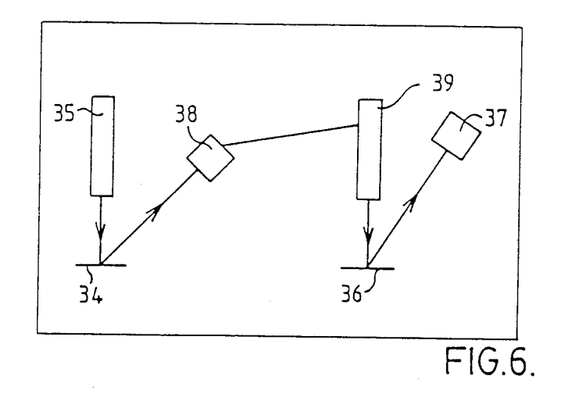

With reference to FIG. 5, a reader system is shown housed in a casing 31 having first and second card positions 32, 33 to which access is gained through respective apertures. The positions 32 and 33 are so arranged that a first key card 34 located at the first position 32 is illuminated by a light source 35. If the card 34 bears an appropriate hologram it reflects light towards a second key card 36 inserted at the second position.

The second key card 36 is inserted with its hologram facing downwardly so as to receive the light from the first card and reflect it to a detector 37 which is arranged to initiate a desired security operation if it "sees" the correct light pattern from the card 36.

In FIG. 5 the card 36 is shown receiving light directly from the card 34 but a mirror or other optical apparatus may be located in the light path between the two cards if desired. For example light from the first card may be transmitted to the second card through fibre-optic cables so that the card positions need not be closely adjacent.

A system similar to that shown in FIG. 5 may have a greater number of card positions such that appropriate hologram-bearing cards located at respective positions act as a relay to transmit light from the light source 35 to the detector 37. Clearly, if any one card is omitted from the relay, or if an incorrect card is inserted at any position, the relay will not be completed and the appropriate security function will not be effected.

FIG. 6 shows an alterative arrangement to that of FIG. 5, in which similar items are indicated by the same reference numerals. In this embodiment, light reflected from the first key card 34 at the first position 32 is detected, not by the second key card 36, but by an intermediate detector 38. If the intermediate detector 38 detects the correct, predetermined code from the hologram on the first key card 34 it switches on an auxiliary light source 39 which illuminates the second key card 36 at the second position 33. The reflection from the card 36 is detected by the detector 37 which initiates the desired security operation if it "sees" the appropriate code.

As in the embodiment of FIG. 5, the security function will not be performed unless both cards 34 and 36 are present and additional card positions with appropriate lights may be incorporated in the relay system if required.

An advantage of this embodiment over that of FIG. 5 is that the card positions 32 and 33, and any other card positions, may be totally remote from one another.

Figure 7:
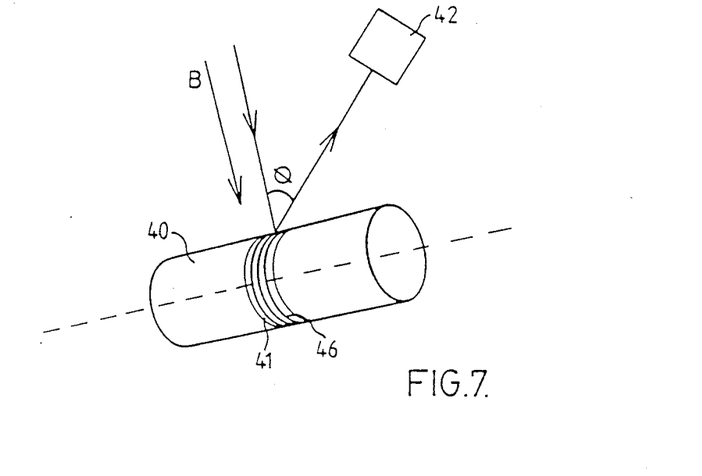
FIG. 7 shows schematically a system for detecting a cylindrical object.

Although reference has been made above to the use of a card as the hologram substrate, the substrate need not in fact be flat and FIG. 7 shows diagrammatically the detection of a cylindrical object 40. For this purpose a holographic film 41 is wrapped circumferentially around the cylinder 40, the hologram having a reflective bar or plurality of reflective bars 46 (only three are shown for simplicity of illustration) comprising the discrete reflective regions, spaced longitudinally of the cylinder and constituting a bar code.

The cylinder is illuminated in the direction B, perpendicular to its longitudinal axis, and reflected beams are detected at an angle $\theta$ to the direction B by a photodiode detector 42. The cylinder is passed through the reader, parallel to its axis, so that each bar 46 is illuminated in turn and reflects light to the detector 42. The signals detected may be used to instigate a security function as indicated in the embodiments described above. The system incorporates an auxiliary detector to check that the reflections are holographic but this is not shown in FIG. 7.

Figure 8:
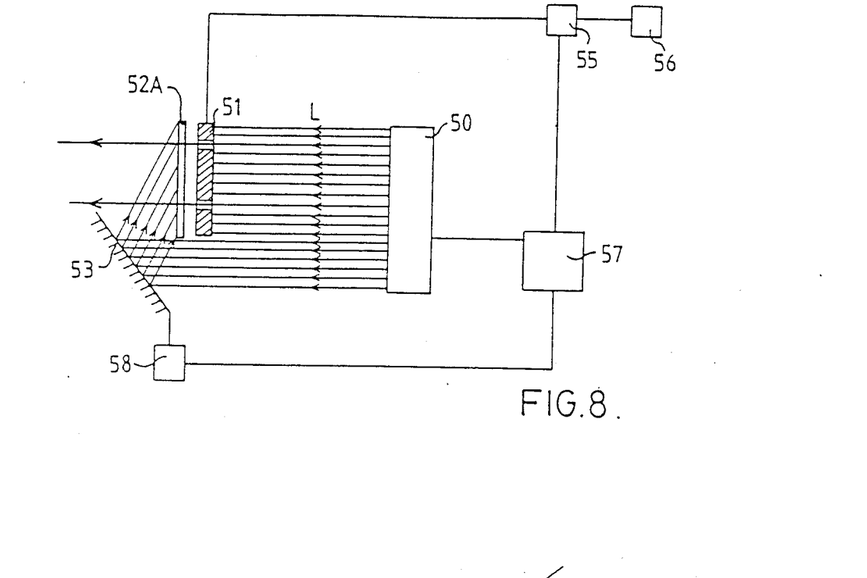
FIG. 8 shows schematically apparatus for producing a series of holograms for use with a system of the invention.
Figure 9:
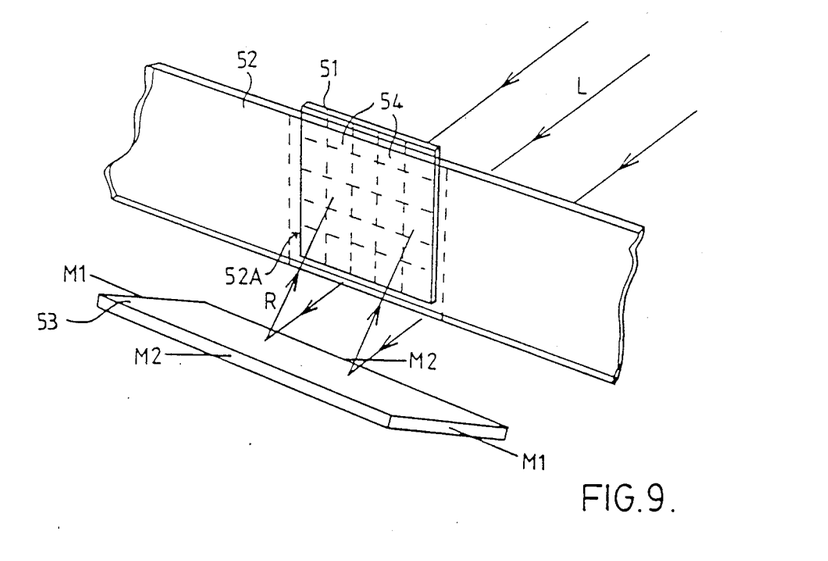
FIG. 9 is a schematic perspective view of part of the apparatus of FIG. 8, on an enlarged scale.

With reference to FIGS. 8 and 9 of the drawings, apparatus is shown purely schematically for making a series of holograms usable in a security system of the invention.

In FIGS. 8 and 9, a system for producing thick-film reflection holograms includes a ruby laser source 50, a generally-flat liquid crystal display panel (LCD) 51, constituting the photographic subject, a film strip 52 of a type having a thick photographic emulsion sensitive to the light emitted by the laser source 50, and a mirror 53.

The panel 51 is located between the laser 50 and the film 52, parallel to the film and as close to it as possible. In practice the panel 51 is between about 1 mm and 5 mm from the film.

The mirror 53 is located on the opposite side of the film 52 from the laser 50 and the LCD panel 51 and is inclined to the film strip.

The panel 51 may, alternatively, be located between the mirror 53 and the film 52.

As shown more clearly in FIG. 9, the LCD panel 51 comprises a 5×5 array of square areas 54 indicated in broken lines in the drawing. Each area 54 is connected in the usual manner for LCDs via a respective switching mechanism 55 to a power supply 56 so that each area 54 can be switched independently of the other areas 54 between its state in which it transmits light and its state in which it is more opaque to light: for clarity of illustration, the connection and switching mechanism 55 of only one of the areas 54 is shown. The switching mechanisms 55 are all controlled by a computer 57 which also controls the laser source 50 and the feed mechanism for the film strip 52.

The general arrangement of the components 50–53 is such that part of the light emitted by the laser 50 is incident, in the direction L, on the LCD panel 51 and is transmitted by those areas 54 in the appropriate "transmitting" state to a frame 52A of the film 52. Another part of the light emitted by the laser 50 is incident directly on the mirror 53 and is reflected therefrom, in the direction R, to the frame 52A of the film 52 where it interferes with the light transmitted through the LCD panel 51. When the film strip 52 is developed, the frame 52A will bear an array of discrete reflective regions corresponding to the array of "transmitting" areas 54 of the LCD panel 52 to which it was exposed.

The reflective regions in the developed film frame 52A will reflect strongly in parallel directions, at the same angle $\theta$ to the plane of the film strip; the direction and angle depend on the inclination of the mirror 53 to the film strip 52 during the exposure. In order to allow the direction and angle of reflection to be varied between exposures, the mirror is pivotally mounted for pivoting movement about two orthogonal axes, indicated M1—M1 and M2—M2 in FIG. 9. The pivoting of the mirror 53 is controlled by a drive mechanism schematically indicated 58 (FIG. 8) which is also controlled by the computer 57.

In use of the system of FIGS. 8 and 9, the computer 57 is supplied with a series of coded patterns of transmitting and opaque LCD areas 54 which it is desired to photograph, together with respective inclinations of the mirror 53, and is arranged to synchronise the operation of the laser source 50, the film feed mechanism, the switching of the LCD areas 54, and the drive mechanism 58 so that each of the said series of patterns is displayed in sequence on the LCD panel 51 and photographed on a respective frame of the film strip 52 with the mirror 53 pivoted to the appropriate setting. The coded patterns may, for example, comprise the codes for a series of bank cheque cards for operating an automatic cash-dispenser as described with reference to FIG. 3.

Some patterns may be photographed more than once if identical holograms are required and some film frames may be exposed several times to produce superposed images of dots which reflect at different angles or to produce dots which reflect at different angles in different positions in the hologram for use, for example, in the system of FIG. 4.

The mirror 53 shown in FIGS. 9 and 10 is a plane mirror but it could be replaced by a faceted mirror so producing holograms of dots which reflect at different angles with a single exposure.

The LCD panel may also be rotatable or pivotable in order to vary the holograms which can be made by the present system. The LCD panel 51 of the apparatus described above could be replaced by alternative polarization-dependent materials such as a Pockels Readout Optical Modulator (PROM), a Hughes liquid crystal light valve (HLCLV) or a birmuth oxide crystal. Such materials are addressable by an addressing laser (such as an argon ion laser) of a different wave length from that used to produce the holograms (ruby laser) so as to change the transmissive characteristics of predetermined areas. These changes are such that during subsequent photography with the ruby laser, polarisation rotation is introduced, by the Pockels effect, into said areas of the laser beam passing through the object panel and, where such rotation has been introduced, no interference will occur between the two beams incident on the photographic emulsion: regions where no interference occurs in the film constitute non-reflective regions of the developed hologram.

The areas of the panel which introduce polarisation rotation into the ruby laser light may be changed between exposures of the holographic film to enable different codes to be photographed as with the use of the LCD panel described above.

The use of such addressable devices enables a further variation in the resulting hologram to be made. For this purpose two identical addressable devices are used, one located in each of the two laser beams incident on the photographic emulsion. The two devices are addressed with addressing lasers to produce the same changes in corresponding areas such that the two photographing laser beams are altered identically by the two devices; thus some areas of the beams retain their original polarisation while other, corresponding areas have their polarisations rotated to the same extent. The result is that the two beams interfere across their entire extent in the photographic emulsion to produce an entirely-reflective hologram, but the reflections from different regions of the hologram have different polarisations.

The hologram produced by such a system will appear substantially-uniformly-reflective to the naked eye but if viewed through a polarising filter, such as POLAROID film, will appear to have lighter and darker regions. The provision of a polarising filter between the hologram and the detectors in a reader as described above will thus enable the hologram to be machine readable.

It should be noted that, although for most uses, the photographic system would be arranged to produce holograms having regions with only two different reflectivities, for example with polarisations at 90° to each other, regions with reflectivities of different polarisations may also be formed by this method.

For some uses of the invention, it is desirable that the holograms contain information which can be deleted or altered after use in a controlled and detectable manner; the hologram may, for example, contain credit information in the form of a number of points which are usable one at a time. For this purpose, one or more reflective regions may simply be cut from the hologram or individual reflective regions may be mechanically abraded to reduce the amount of light reflected therefrom. Alternatively local heating of the reflective regions to a sufficiently high temperature causes permanent plastic deformation of the film gel and changes the light characteristics of those regions, the changes being detectable by a reading system of the invention.

Such changes may be made to the carrier rather than to the hologram itself; the hologram may, for example, be supported on a heat-sensitive material which changes from a light to a dark colour when heated. This change would be obvious to the naked eye but could also be arranged to affect detection of the holographic reflections.

A further alternative is the inclusion of a photoresponsive chemical in the carrier or in the holographic film or in any protective cover for the film, which chemical can be selectively illuminated with a suitable light source to alter the light characteristics of the hologram either locally or in its entirety.

In certain applications it is necessary to valuate or authenticate documentation which cannot be contacted directly, for example, Vehicle Excise licenses and Entry Cards for dockyards, both of which are presented behind a glass windscreen. A system of the invention is able to perform this function as follows:

The identity card or license carrying a hologram as described above is held in contact with the glass of a window or windscreen and is then illuminated by either a white light source or a low-power laser directed through the glass. The resultant reflected light from the hologram is detected by appropriate detectors arranged to make allowance for the angular changes introduced by the refractive index of the glass. In this case the reader may be an illuminator/camera arrangement and may be hand-held or remote controlled.

What is claimed is:

1. An identifiable security device comprising a carrier supporting holographically-applied identifying information, characterised in that the said information is provided in a single piece of thick holographic film and includes at least one discrete reflective region surrounded by film of different reflectivity, the reflective region being adapted to be read directionally and optically without a focusing system according to at least one optical parameter comprising intensity, wave length and polarisation of light reflected from the reflective region.

2. A security device according to claim 1, characterised in that the carrier comprises key fob, a key card, credit card, bank note, ticket or document.

3. A security device according to claim 1, characterised in that the identifying information comprises a single discrete reflective region.

4. A security device according to claim 1, characterised in that said identifying information is provided in a plurality of discrete reflective regions arranged in a coded array.

5. A security device according to claim 4, characterised in that the reflective regions form a bar code or comprise dots arranged in a regular matrix or comprise Moray fringes.

6. A security device according to claim 4, characterised in that the discrete reflective regions are arranged in a plurality of groups, the regions in each group reflecting light in the same direction, which direction is different from the directions of reflection of the other groups, and in which the different groups contain different identifying information for effecting different functions.

7. A security device according to claim 1, characterised in that the holographic film is fixed to the carrier by a security glue such that it will be destroyed by attempts to remove it.

8. A security device according to claim 1, characterised in that the holographically-applied information is obscured to visual inspection by a surface coating or patterning or by a superposed hologram.

9. A security device according to claim 1, characterised in that the holographic film appears substantially-uniformly reflective in unpolarised light but has a said at least one discrete reflective region which reflects light with a different polarisation from the rest of the film, which region is detectable through a polarising filter.

10. A security device according to claim 1, characterised in that the thick holographic film is supported on a uniformly-dark or black substrate which is fixed to the carrier.

11. A security device according to claim 1, characterised in that the substantially-transparent thick holographic film is glued directly to the carrier.

12. A security system including a security device comprising a carrier supporting holographically-applied identifying information and a reader arranged to read said information, characterised in that the information is provided in a single piece of thick holographic film and includes at least one discrete, directionally-reflective region surrounded by film of different reflectivity and said reader has: a reading position for the carrier; means for illuminating the at least one reflective region when the carrier is at the reading position and reading means for optically and directionally detecting light reflected from each reflective region according to at least one optical parameter comprising intensity, wave length and polarisation of light and for discriminating against non-holographic reflections therefrom, the reading means being arranged to detect light from each region without the interposition of a focusing system and the reader being arranged to perform a security operation on detection of the holographically-applied information by the reading means.

13. A security system according to claim 12, characterised in that the reading means include detector means for detecting light reflected from the at least one reflective region in a predetermined direction of reflection and at least one auxiliary detector (11) for detecting light reflected from at least one reflective region in a direction other than the predetermined direction, the reader being arranged to perform the security function only if the detector means detect light from the at least one region above a predetermined threshold of intensity but the auxiliary detector does not.

14. A security system according to claim 13, for authentication of a carrier characterised in that the thick holographic film contains only one directionally-reflective region, the detector means comprise a single photodiode detector and the reader has advisory means arranged to advise a user of the presentation of an authentic carrier to the reader when the carrier is illuminated at the reading position and the detector detects reflected light from the reflective region above the predetermined threshold but the auxiliary detector does not.

15. A security system according to claim 13, characterised in that the information is provided in a plurality of reflective regions arranged in a predetermined coded sequence in a line in the film, the regions reflecting light in parallel directions, and in which the detector means comprise a single photodiode detector arranged to detect light reflected from each region in the line in turn as the carrier is passed through the reading position in a direction parallel to the said line, the reader being arranged to perform the security function on detection of the predetermined coded sequence.

16. A security system according to claim 14, characterised in that the reflective regions are arranged in several parallel lines, the regions in any one line reflecting light in parallel directions, and in which the detector means comprise the same number of detectors as the number of lines of reflective regions, each detector being arranged to detect reflections from a respective line as the carrier is passed through the reading position.

17. A security system according to claim 15, characterised in that the reader is arranged to perform a security operation, or one of a predetermined group of security operations, on detection of one of a plurality of predetermined coded arrays of reflective regions.

18. A security system according to claim 17, characterised in that the reader is part of an automatic bank dispenser and the system includes a plurality of personalised bank cheque cards constituting carriers of the system, each cheque card carrying a respective personal identifying code, and the reader being arranged to operate the bank dispenser in accordance with the code detected.

19. A security system according to claim 17, characterised in that the reader is part of a locking system for groups of secure areas and is arranged to detect each of a plurality of coded arrays of reflective regions, there being a coded array corresponding to each group of secure areas, and to effect the unlocking of the corresponding group of secure areas on detection of a respective array, the system further including a plurality of carriers each having a respective coded array or plurality of coded arrays of reflective regions.

20. A security system according to claim 13, characterised in that the reader has a series of reading positions for an equal number of carriers arranged such that light reflected from a hologram on a carrier at a first reading position is reflected in a relay, via the holograms on carriers at subsequent reading positions, to a carrier at a final reading position and thence to the detector, means, the security operation being effected only when the relay is completed by the positioning of carriers with appropriate holograms at each of the reading positions and light is relayed from the hologram at the first position via the subsequent holograms to the detector means.

21. A security system according to claim 14, in which the or each photodiode detector and the auxiliary photodiode detector are located at a distance of from about 1 mm to about 30 mm from the holographic film at the reading position.

22. A security system as claimed in claim 14, in which light from the or each reflective region is transmitted to the or each photodiode detector and/or the auxiliary photodiode detector through a respective fibre-optic cable the input end whereof is located at a distance of from about 1 mm to about 30 mm from the holographic film at the reading position.

23. A security system as claimed in claim 12, in which the means for illuminating the at least one reflective region comprise at least one light-emitting diode located at a distance of from about 1 mm to about 30 mm from the holographic film at the reading position.

24. A method for producing a hologram including at least one discrete reflective region, comprising setting up a holographic photography system including a laser source, a thick-film photographic emulsion sensitive to the laser light, reflection means on the opposite side of the emulsion from the laser source for reflecting light from the laser source on to an area of the emulsion on which light is also incident directly from the laser, and an object located at a distance from 1 mm to 5 mm from the emulsion, on either side thereof, and having at least one discrete area transparent to the laser light, such that, in operation of the photography system, laser light is incident on the emulsion both through the transparent area of the object and directly from the reflection means or the laser source and creates an interference pattern in the emulsion constituting the at least one reflective region.

25. A method according to claim 24 for producing a series of holograms having different coded arrays of reflective regions, in which the emulsion is supported on a continuous film which is fed intermittently through the photography system so as to expose successive frames to the laser light; the said object comprises a generally-flat panel having an array of discrete areas which can be switched between different states of transmission and reflection to the laser light; and in which discrete areas of the panel are switched appropriately between exposures of respective frames of the photographic emulsion to provide different arrays of transmissive areas corresponding to the different desired coded arrays of reflective regions to be produced in the developed holograms.

26. A method according to claim 25, in which the film feed mechanism, the operation of the laser and the switching of the areas between the different transmissive states are controlled in synchronism by a computer which is previously supplied with a set of codes which it is desired to reproduce in holographic form.

27. A method according to claim 26, in which the reflection means are constituted by a mirror which is mounted on a pivotal support which is also controlled by the computer so that the inclination of the mirror to the film can be changed between exposures to change the direction and/or inclination of the reflections from the reflective regions relative to the film.

28. A method according to claim 27, in which the mirror is pivotable about two mutually-perpendicular axes.

29. A method according to claim 25, in which the object panel comprises a liquid crystal display.

30. A method according to claim 25, in which the object panel comprises a Pockels Readout Optical Modulator, a Hughes liquid crystal light valve or a bismuth oxide crystal which is a addressable by a laser having an operating wavelength different from that of the photography laser to change the optical characteristics of discrete areas.

31. A method for producing a hologram including at least one discrete region having different reflection characteristics from the remaining area of the hologram, comprising setting up a holographic photography system including a laser source, a thick-film photographic emulsion sensitive to the laser light, reflection means on the opposite side of the emulsion from the laser source for reflecting light from the laser source on to an area of the emulsion on which light is also incident directly from the laser, and two identical panels, one located in each of the two laser beams incident on the emulsion, each panel having at least one discrete area which rotates the plane of polarisation of transmitted light to a different degree from the remainder of the panel so that, on exposure of the emulsion, a discrete region thereof is impinged upon by the parts of the laser beams transmitted through the at least one discrete area of the two panels, which parts interfere within the emulsion to produce a discrete region which reflects light with a polarisation which is different from that of the light reflected from the interference pattern created within the remaining area of the emulsion.

32. A method according to claim 31, in which the panels comprise Pockels Readout Optical Modulators, Hughes liquid crystal light valves or bismuth oxide crystals.

33. A hologram including at least one discrete reflective region having different reflection characteristics from the remaining area of the hologram, made by a method according to claim 24.

* * * * *